US006833785B2

(12) United States Patent
Brown et al.

(10) Patent No.: US 6,833,785 B2
(45) Date of Patent: Dec. 21, 2004

(54) VEHICLE SECURITY SYSTEM

(75) Inventors: Michael Wayne Brown, Georgetown, TX (US); Rabindranath Dutta, Los Angeles, CA (US); Michael A. Paolini, Ausitn, TX (US); Newton James Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 10/093,446

(22) Filed: Mar. 7, 2002

(65) Prior Publication Data

US 2003/0169161 A1 Sep. 11, 2003

(51) Int. Cl.[7] .......................... B60R 25/10; B60R 25/04
(52) U.S. Cl. ........................... 340/426.12; 340/426.19; 340/426.2
(58) Field of Search ............ 340/426.1, 426.11–426.23, 340/425.5, 5.31, 5.72; 307/10.2–10.5; 280/287; 342/357.07

(56) References Cited

U.S. PATENT DOCUMENTS

| | | | | |
|---|---|---|---|---|
| 3,878,511 A | * | 4/1975 | Wagner ...................... 340/5.28 |
| 4,821,309 A | * | 4/1989 | Namekawa ............... 455/404.1 |
| 5,157,375 A | * | 10/1992 | Drori .......................... 340/429 |
| 5,307,048 A | * | 4/1994 | Sonders ................. 340/426.12 |
| 5,349,329 A | * | 9/1994 | Smith ..................... 340/539.21 |
| 5,513,244 A | * | 4/1996 | Joao et al. ............... 455/404.1 |
| 5,635,901 A | * | 6/1997 | Weinblatt .............. 340/426.12 |
| 5,818,329 A | * | 10/1998 | Allen .................... 340/426.17 |
| 5,874,889 A | * | 2/1999 | Higdon et al. ......... 340/426.36 |
| 6,018,291 A | * | 1/2000 | Marble et al. ......... 340/426.12 |
| 6,049,269 A | * | 4/2000 | Byrd et al. ............ 340/426.21 |
| 6,067,007 A | * | 5/2000 | Gioia .................... 340/426.19 |
| 6,434,400 B1 | * | 8/2002 | Villevieille et al. ...... 455/550.1 |

* cited by examiner

Primary Examiner—Jeffery Hofsass
Assistant Examiner—Anne V. Lai
(74) Attorney, Agent, or Firm—Mark S. Walker; Streets & Steele; Jeffrey L. Streets

(57) ABSTRACT

A method, computer program product, and system for alerting authorities during a car theft. A personal identification number, either a normal code or a duress code, is received into an vehicle security system. If the duress code has been entered, then the security system is disarmed, wherein the vehicle may be entered and driven away without any indication of an alarm. However, the duress code triggers a process by which authorities are notified and the location of the vehicle may be provided. The vehicle is disabled upon a certain event or condition, such as a pre-determined amount of time passing or a pre-determined distance driven. The method may also require satisfying a second event or condition before disabling the vehicle, such as the vehicle traveling at a low speed, in order to avoid causing an unsafe condition. The duress code preferably has an identical number of alphanumeric characters as a normal personal identification number entered to disarm the security system.

30 Claims, 3 Drawing Sheets

US 6,833,785 B2

VEHICLE SECURITY SYSTEM

BACKGROUND OF THE INVENTION

1. Field of the Invention

The present invention relates to security systems for vehicles and more specifically, to methods for notifying or summoning authorities during a crime in progress.

2. Description of the Related Art

There is good reason for car owners to take precautions when approaching their cars in a public parking lot, especially if they are alone at night. Car thieves will sometimes directly confront or assault a car owner and forcibly take the car. When confronted with such a threat, the first concern of the car owner is to escape to safety, even if escaping requires the owner to abandon the car to the thief. Nevertheless, there is a need for a vehicle security system and method that will frustrate the purpose of the car thief.

A conventional car security system may either sound an alarm or disable the vehicle immediately at the time of theft. Such a system may be ineffective since an experienced car thief will recognize the existence of the vehicle security system. Furthermore, disabling the vehicle during a forcible robbery in the presence of a car owner or operator can be dangerous, since the prolonged contact between the car owner and thief allows the thief to direct violence against the car owner.

Therefore, there is a need for a method and system that notifies appropriate law enforcement or security authorities of the crime in progress. It would be desirable if the method and system facilitated separation of the thief and the car owner by allowing the car thief to drive off. It would be even more desirable if the method and system enabled a quick and simple recovery of the car.

SUMMARY OF THE INVENTION

The present invention provides a method, computer program product, and system for alerting authorities or emergency contacts during a car theft. The method comprises receiving a personal identification number into a vehicle security system; determining that a duress code has been entered; disarming the security system, wherein the vehicle may be entered and driven away without any indication of an alarm; and then disabling the vehicle upon satisfying a certain condition, such as a pre-determined amount of time or a predetermined distance. Before disabling the vehicle, it may be preferable to also satisfy a second condition, such as the vehicle traveling at a low speed, in order to avoid causing an unsafe condition. Preferably, the duress code has an identical number of alphanumeric characters as a normal personal identification number entered to disarm the security system.

The security system processor or controller within the vehicle determines that the duress code has been entered by reading the entered code, and then comparing the entered code with the duress code that is stored in memory. The vehicle is then later disabled by various means, for example, by closing a solenoid valve in a fuel line or by opening a circuit breaker in an ignition power circuit. After the vehicle has been disabled, the security system may then alert people around the car by setting off an alarm selected from sounding the horn, sounding an alarm siren, blinking the headlights, blinking the tail lights or combinations thereof.

If a mobile telephone is installed in the vehicle, then the method may further comprise retrieving a telephone number for authorities or other emergency contacts from the security system memory, and then silently calling authorities at the telephone number retrieved in order to notify them of the car theft and allow them to determine the vehicle's location. In the future, mobile telephone systems will have the capability to determine the location of a given mobile telephone (a capability referred to as "Enhanced 911") and using this feature would serve the present purpose. If a global positioning system is installed in the vehicle, the method further comprises reading the vehicle's location from the global positioning system, and then notifying the authorities of the vehicle's location. Notification may be by means selected from a pre-recorded message or an interactive voice response system, or combinations thereof.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION

Figure 1:
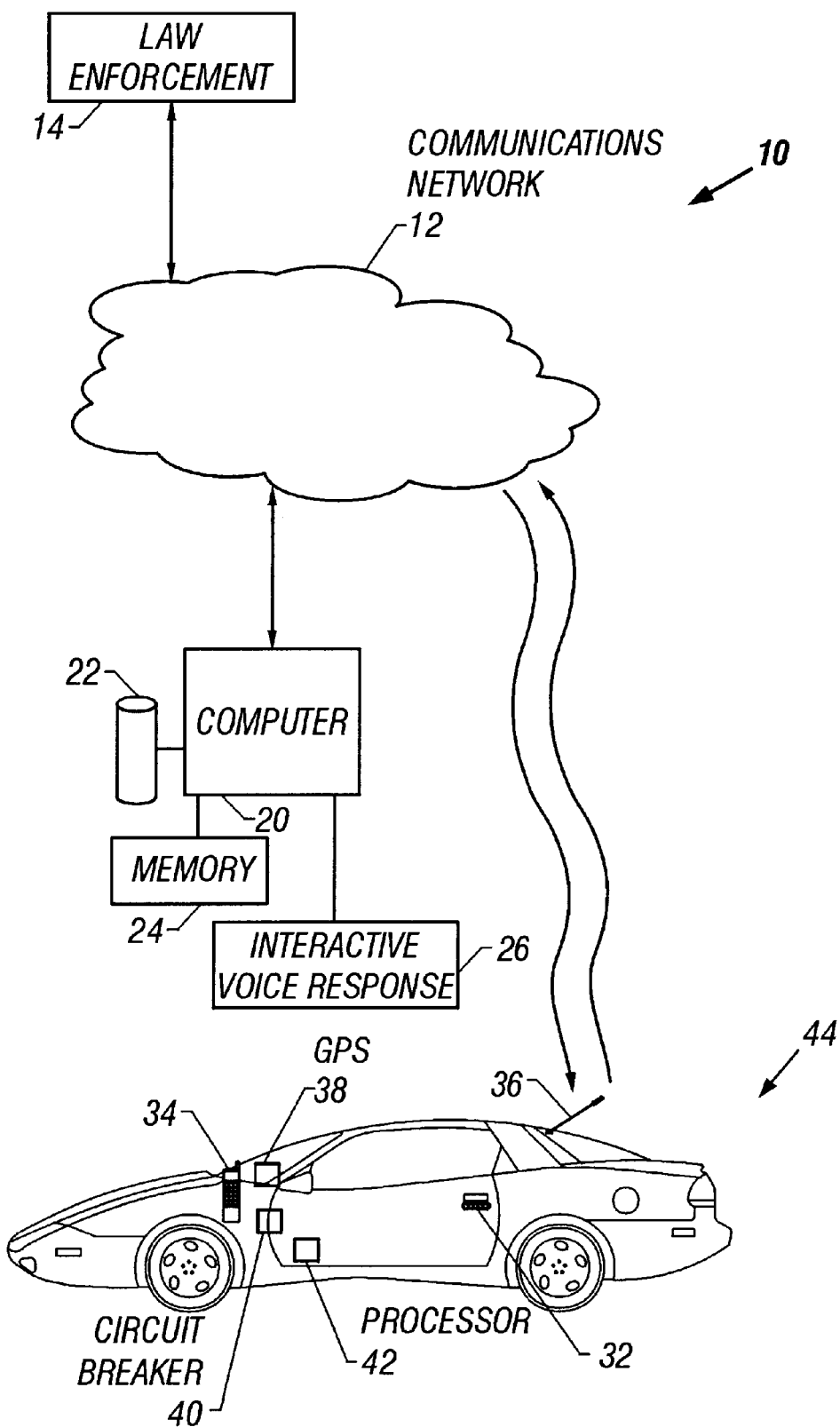
FIG. 1 is a schematic of a system that may be used to implement the present invention.

The present invention provides a method for using a vehicle security system in a manner that provides an outward appearance of a typical use of the security system or other electronic device, but in reality the security system is being used to notify authorities or emergency contacts of a crime in progress and/or to disable a vehicle shortly after the vehicle is stolen. More specifically, the present invention uses an alternate code, or duress code, to replace a normal security code that must normally be entered into a security system or other type of device.

The user's duress code will preferably have a format that is similar to that of the user's normal code, so that it is improbable that a thief observing the user's entry of the duress code on the keypad would know that the user's duress code was entered since the number sequence is not readily identifiable. In particular, the duress code and normal code should contain the same number of characters and the same type of characters. Especially since the duress code appears to result in the disabling of the security system, the thief will presumably have no reason to suspect an alarm has been triggered.

In one embodiment, the system accepts a security code having a certain number of digits assigned to the user and a certain number of digits that are option codes. The option codes may allow the user to initiate a variety of predetermined actions or enter a variety of predetermined information. The predetermined actions may include, without limitation, setting an alarm, triggering a false error message, and calling a friend. Such predetermined actions are only limited by the nature of electronic communications and control, how widely the electronic communication of the network of the monitoring service will reach and the authorization that the user has provided to facilitate the requested actions. The predetermined information may include, without limitation, the user's duress, the number of thieves, the type of weapons carried by the thieves, and how many people are with you. For example, assume that a security code is made up of five digits, the first four digits being dedicated to a unique identification number or password associated with the account, and the fifth digit dedicated to a predetermined option code. Continuing with the example, the predetermined option codes may include: "0" to indicate no duress; and "1" through "9" to indicate duress with the same number of thieves present as the number entered. Consequently, a security code entry of "84632" would be entered if the unique identification number was "8463" and the transaction was being made under duress with "2" thieves present. Optionally, some digits may be dedicated to other user-defined action or information as set out in the user's preferences registered and maintained by the security system monitoring service. In accordance with this format, it is possible to have more than one "normal code" and/or more than one "duress code".

The duress code may initiate actions beyond the typical use of the device, such as alerting authorities or emergency contacts of a crime in progress. It is an advantage that the method initiates these actions without alerting the criminal or suspect that additional steps are being taken, thus protecting a victim from a possible violent outburst during an attempt to summon help. When the victim enters the duress code, the criminal or suspect will believe that the entered code is a normally entered code and not realize or be able to detect that the entered code is a duress code. All responses to the entered duress code, as far as the victim and criminal or suspect can immediately observe, appear to be as if the normal code was entered. The duress code is typically entered into a vehicle security system by using a keypad when the owner is under duress from a car thief.

An exemplary vehicle security system includes a central processor or controller connected to sensors located throughout the vehicle that detect tampering or intrusion. The controller has memory capability to store codes, procedures, events, telephone numbers, and other necessary information for the operation of the security system. The security system also operates to give an alarm indication in the event of tripping a sensor or other triggering event. The alarm indication may typically be a flashing of the lights and/or sounding of the vehicle horn or a siren.

Furthermore, upon occurrence of an alarm condition, such as the entry of a duress code, the vehicle fuel supply and/or ignition power may be selectively disabled. These disabling functions prevent the car from starting or, alternatively, immobilize the car after it has traveled a pre-defined distance or after passing of a pre-defined time period. The purpose of the delay in immobilizing the car is to allow the car, and the car thief, to be some distance away from the car owner at the time the car is immobilized so that the car thief does not react violently against the car owner.

However, recognizing the possibility that the vehicle owner may be forced to go with the car thief, the present invention preferably includes the option of a second duress code that initiates the notification of authorities, but does not disable the vehicle. Alternatively, if the vehicle includes sensors capable of detecting the number of people in the vehicle, such as pressure sensors in the seats, then the number of thieves indicated in the duress code is compared with the number of people detected to be in the vehicle to determined whether the vehicle owner has been forced to g) along with the thieves. For example, if the duress code has an option code of "2", then the vehicle owner is indicating the presence of two thieves. If the seat sensors indicate that three people are then in the car, it is highly likely that the third person is the vehicle owner. Consequently, the processor should be prevented from disabling the vehicle to avoid putting the vehicle owner in greater danger.

FIG. 1 is a schematic of a system that may be used to implement the present invention, including a vehicle 44 having a keypad 32 that is part of the vehicle security system and allows entry to the car after entering a valid security code, such as a normal code or a duress code. Upon entering the normal code, the processor 42 compares the stored normal code with the entered code and, if the codes match, unlocks the door. Alternatively, the security keypad may be inside the car and, until the normal code is entered, the car remains immobilized and cannot be started. Immobilization may be accomplished, for example, by closing a solenoid valve in the fuel supply line or opening a circuit breaker 40 in the ignition power circuit. The vehicle may also have a mobile telephone 34 and/or a Global Positioning System (GPS) 38 mounted in the car. Either or Both of these devices may be tied into the security system making them available to the security system's central processor or controller. The processor or controller may then determine the location of the vehicle from the mobile telephone, if equipped with a mobile telephone location system, or the GPS. The mobile telephone may then be used, including the use of antenna 36 or any other available antenna, to contact authorities and report the current location of the vehicle, and to indicate an alarm condition if the vehicle security system determines there has been a breach of security. Preferably, the mobile telephone will be used in a silent manner to periodically or continuously report the location of the vehicle, thereby allowing the vehicle to be tracked and recovered.

Alternatively, the mobile telephone may be used to contact a telephone service provider or the provider's server 20 with information regarding the duress conditions. The mobile telephone service provider will typically have the ability to identify the location of the mobile telephone even if the mobile telephone itself does not contain its own location information or does not have access to a GPS device. In this manner, the telephone service provider can append the alarm notification with information pertaining to the mobile telephone's location before forwarding the notification to the law enforcement authorities 14 or other emergency contacts. Further advantages of routing the alarm signal or notification through the mobile telephone service provider include access to much greater processing power than is available on the vehicle and an Interactive Voice Response System (WRS) 26 that can be used for sending voice messages over a telephone system to a mobile or line based telephone of the law enforcement authorities or the like. Specifically, IVRS is an application program that may be run on the telephone service provider's server that executes text-to-speech synthesis programmed instructions using ASCII input to generate an audio rendition of that ASCII input in a machine synthesized voice. Therefore, for example, after retrieving the vehicle owner's name, location, and duress conditions, the IVRS may insert this information in a pre-set format for conveying this information through voice synthesized audio to the authorities.

If a car thief threatens the car owner, or other authorized person, and demands that the owner provide the keys to the vehicle and disarm the security system, the owner should enter the duress code. The duress code maybe any combination of alphanumeric characters, other than the normal code, but will preferably have the same number of characters as the normal code. Upon entry of a code, the processor determines whether the entered code is the stored normal code, the stored duress code, or an incorrect code. If the normal code has been entered, the processor disarms the security system, unlocks the doors, and/or mobilizes the vehicle by either opening the solenoid valve in the fuel line or closing the circuit breaker in the ignition power circuit so that the vehicle may be started. The car may then be started and driven away by the authorized person who entered the normal code.

If the duress code has been entered, the processor first follows the same procedure as though the normal code had been entered so as not to alert the car thief that the duress code, and not the normal code, had been entered. Therefore, the processor either unlocks the door or mobilizes the car by either opening the solenoid valve in the fuel line or closing the circuit breaker in the ignition power circuit so that the vehicle may be started. The processor may further indicate that the security system has been disarmed such as, for example, turning off an "armed" signal and turning on an "unarmed" signal, based upon the features of the safety device so that the car thief will not be able to discern that the safety device is aware of the situation. The car thief may then drive away in the car. Optionally, where the vehicle has an installed telephone, the processor may make the telephone's microphone active, both during and after the entry of the duress code, so that sounds and conversations within the vehicle can be monitored by the authorities or emergency contacts notified.

If an incorrect code is entered, the security system will not disarm the system and not unlock the doors. The security system may allow a predetermined number of additional attempts to enter the correct normal code. If the correct code is not entered within the maximum allowable number of attempts, the security system may trigger an alarm indicating that there is an attempted breach of security.

Either after a pre-set period of time following entry of the duress code or after a preset distance driven after entry of the duress code as measured by the vehicle's odometer, the processor immobilizes the vehicle either by closing the solenoid valve in the fuel line or by opening the circuit breaker in the ignition power circuit or by any other means that will immobilize the vehicle. Optionally, the processor may cause the horn or siren to sound and cause the headlights and tail lights to blink or trigger other attention-getting devices or combinations thereof. The advantage of the present invention allows the car thief to drive away before the vehicle is immobilized, thereby separating the owner and the car thief before the car thief has a violent reaction to the immobilization of the vehicle. Preferably, the processor will monitor the operating condition of the vehicle and only disable the vehicle during a safe condition following the expiration of the time or distance limitation. For example, the processor may monitor the vehicle speedometer and only disable the vehicle at speeds less than 5 miles per hour or at a stop. Alternatively, the processor may gradually reduce the throttle or otherwise cause a gradual reduction in operation of the vehicle so that the vehicle becomes disabled or unusable in a safe manner.

As another option, the processor may utilize the mobile telephone mounted or installed in the car to silently report the car theft with a pre-recorded message. The number dialed by the processor may be a number stored in the security system memory that connects with a service, provided by the vehicle company, the security device company, or other service provider, that receives and acts upon such notices. Alternatively, the processor could be programmed to dial a standard emergency telephone number such as, for example, 911. If the vehicle has a Global Positioning System (GPS) mounted in the car, the processor could report the location of the vehicle by gathering that information from the GPS and including that information in the telephone message. Furthermore, with a GPS, the processor could determine the location of the car and, based upon the location, retrieve a telephone number stored in its memory by location, for authorities responsible for emergencies in the present location of the vehicle. Alternatively, the mobile telephone system could provide location information, for example through emergency location services or enhanced 911.

Figure 2A:
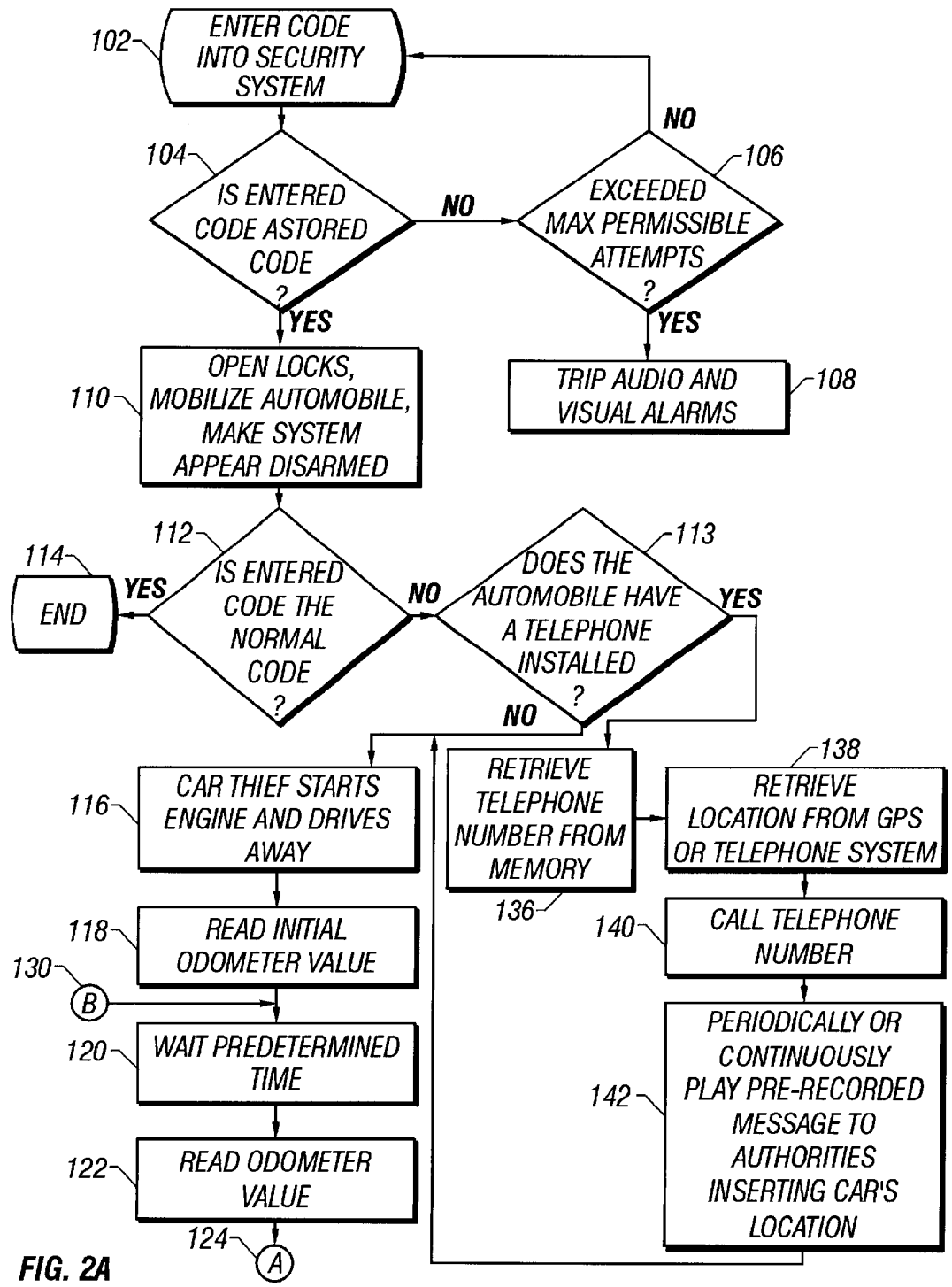
FIGS. 2A and 2B show a flow chart of a method for alerting authorities during a car theft.
Figure 2B:
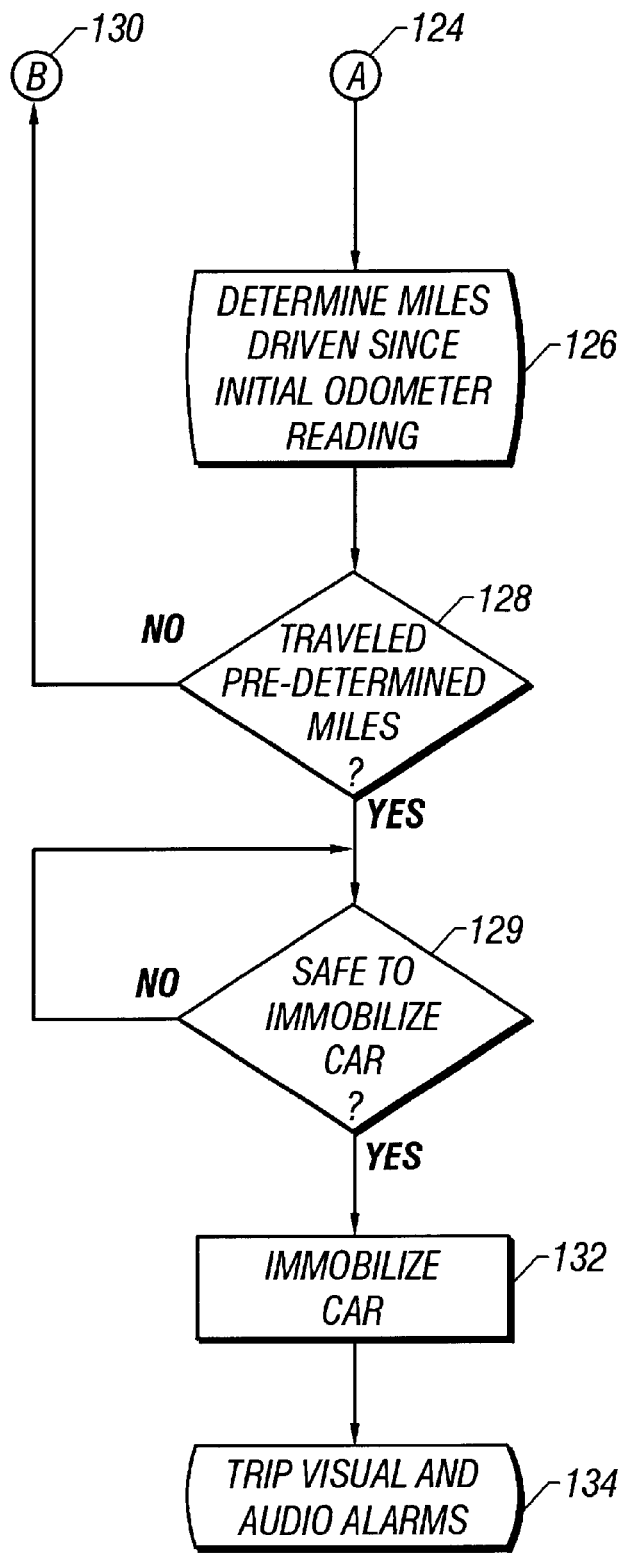

FIG. 2 is a flowchart of a method that may be executed on the system shown in FIG. 1 during a car theft. In state 102, a car owner or authorized driver enters a code into the security system using a keypad. Under normal circumstances the entered code is the normal code. However, if the person entering the code is under duress to disarm the vehicle's security system, then the person enters the duress code into the security system. In state 104, the security system's processor compares the entered code with the stored normal code and the stored duress code and determines whether the entered code matches either of the stored codes. If, in state 104, the code does not match one of the stored codes, then, in state 106, the processor determines if the entry attempt is greater than a preset number of maximum allowable attempts to enter a correct code. This allows the authorized driver to mistakenly enter the code a few times without triggering an alarm. If, in state 106, the maximum number of allowable attempts has not been made, then the method starts over at state 102. E, in state 106, the maximum number of attempts allowed has been exceeded, then in state 108, the security system trips the audio and visual alarms, such as flashing the lights and sounding the horn and/or a siren for a set period of time.

If, in state 104, the entered code matches one of the stored codes, then in state 110, the security system disarms itself, unlocks the doors and mobilizes the vehicle by opening the solenoid valve on the fuel line or closing the circuit breaker on the ignition power system or by otherwise taking steps necessary to mobilize the vehicle from the immobilized state. It is important to note that at this point, the system has responded exactly the same whether the normal code was entered or the duress code was entered. This ensures that the person imposing the duress has no indication that anything other than a normal disarming of the vehicle's security system has occurred. If, in state 112, the normal code was entered, then in state 114, the method ends with the authorized driver having full access to the vehicle restored. If, in state 112, the normal code was not entered, then the duress code was entered, and the method continues with state 113 to determine whether the vehicle has a telephone installed. If a telephone is determined to be installed in the vehicle in state 113, then, in state 136, a telephone number is retrieved from memory to contact the authorities and report the crime in progress. Furthermore, if the vehicle has a security system that communicates with a GPS mounted in the car or a mobile telephone location system installed in the telephone, then, in state 138, the processor can determine the location of the vehicle. In state 140, the processor then places a silent telephone call using the telephone to the telephone number retrieved from storage and, in state 142, periodically or continuously plays a recorded message to the authorities reporting the theft and inserting the current location of the vehicle into the message. The silent telephone call is carried out by the processor using the telephone antenna, but without sending any audio signals to the vehicle or telephone speakers.

In state 116, the car thief may start the engine and drive the vehicle away, thereby removing the car thief from the vicinity of the person under duress so that the person may safely escape and summon help. In state 118, the security system processor reads the initial odometer value and in state 120, waits a pre-determined length of time before, in state 122, reading the current odometer value again. In state 124, the method continues to state 124 of FIG. 2B. In state 126, the processor determines the miles driven since the initial odometer value and if, in state 128, the miles driven are not at least the minimum pre-determined amount, then in state 130, the method continues back to state 120 of FIG. 2A. If, in state 128, the number of miles traveled is greater than the minimum pre-determined amount, then in state 129, the processor determines whether the vehicle is currently being operated in a condition that is safe to be disabled, such as moving at a low speed or sitting at a stop. If it is not safe to disable the vehicle, then state 129 is repeated. Once a safe condition is determined, then in state 132, the processor immobilizes the car by, for example, opening the circuit breaker on the ignition power circuit and then, in state 134, trips the visual and audio alarms, such as, for example, sounding the horn and flashing the headlights and taillights.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of alerting authorities during a car theft comprising the steps:
   receiving a personal identification number into a vehicle security system;
   determining that the personal identification number is a duress code; then
   disarming the security system, wherein the vehicle maybe entered and driven away without any indication of an alarm; and
   disabling the vehicle after one or more predetermined event.

2. The method of claim 1, wherein the one or more predetermined event is selected from the passing of a pre-determined amount of time, the traveling of a pre-determined distance, or proximity of a police car.

3. The method of claim 1, wherein the duress code has an identical number of alphanumeric characters as a normal personal identification number, wherein the normal personal identification number is the number entered to disarm the security system.

4. The method of claim 1, wherein the step of determining that the duress code has been entered further comprises:
   reading the entered code;
   retrieving the duress code from memory; and
   comparing the entered code with the duress code.

5. The method of claim 1, wherein the step of disabling the vehicle is selected from shutting off a fuel line or opening a circuit breaker in an ignition power circuit.

6. The method of claim 1, further comprising:
   determining that the vehicle is in a safe condition for being disabled before disabling the vehicle.

7. The method of claim 1, after the vehicle has been disabled, further comprising:
   sounding an alarm selected from sounding the horn, sounding an alarm siren, blinking the headlights, blinking the tail lights or combinations thereof.

8. The method of claim 1, wherein a mobile telephone is installed in the vehicle, the method further comprising:
   retrieving a telephone number for authorities from a security system memory,
   calling authorities at the telephone number; and
   notifying the authorities of the car theft.

9. The method of claim 8, wherein the authorities are selected from law enforcement, alarm system provider, private security provider or combinations thereof.

10. The method of claim 8, wherein a Global Positioning System is mounted in the vehicle, further comprising:
    reading the location of the vehicle from the global positioning system; and
    notifying the authorities of the vehicle's location.

11. The method of claim 8, wherein the step of notifying is by means selected from a pre-recorded message or an interactive voice response system, or combinations thereof.

12. The method of claim 8, wherein the step of calling authorities is done silently.

13. The method of claim 1, wherein a mobile telephone is installed in the vehicle, the method further comprising:
    reading the location of the vehicle from a location system using the mobile telephone; and
    notifying the authorities of the vehicle's location.

14. A computer program product on a computer readable medium comprising:
    receiving instructions for receiving a personal identification number into a vehicle security system;
    determining instructions for determining that the personal identification number is a duress code; then
    disarming instructions for disarming the security system, wherein the vehicle may be entered and driven away without any indication of an alarm; and
    disabling instructions for disabling the vehicle engine after a period selected from a pre-determined amount of time or a pro-determined distance.

15. The computer program product of claim 14, wherein the duress code has an identical number of alphanumeric characters as a normal personal identification number, and wherein the normal personal identification number is the number entered to disarm the security system.

16. The emptier program product of claim 14, wherein the determining instructions for determining that the duress code has been entered further comprises:
    reading instructions for reading the entered code;
    retrieving instructions for retrieving the duress code from memory; and
    comparing instructions for comparing the entered code with the duress code.

17. The computer program product of claim 14, wherein the disabling instructions for disabling the vehicle is selected from closing instructions for closing a solenoid valve in a fuel line or opening instructions for opening a circuit breaker in an ignition power circuit.

18. The computer program product of claim 14, further comprising:
    sounding instructions for sounding an alarm after the vehicle has been disabled, the alarm selected from sounding the horn, sounding an alarm siren, blinking the headlights, blinking the tail lights or combinations thereof.

19. The computer program product of claim 14, further comprising:
    retrieving instructions for retrieving a telephone number for authorities from a security system memory,
    calling instructions for calling authorities at the telephone number using a mobile telephone installed in the vehicle; and notifying instructions for notifying the authorities of the car theft.

20. The computer program product of claim 19, wherein the notifying instruction provide for silently notifying the authorities.

21. The computer program product of claim 19, wherein the authorities are selected from law enforcement, alarm system provider, private security provider, or combinations thereof.

22. The computer program product of claim 19, further comprising:
   reading instructions for reading the vehicle's location from a global positioning system within the vehicle; and
   notifying instructions for notifying the authorities of the vehicle's location.

23. The computer program product of claim 19, further comprising:
   reading instructions for reading the location of the vehicle from a telephone that is installed in the vehicle having a location determining system.

24. A system for alerting authorities during a car theft comprising:
   means for receiving a personal identification number into a vehicle's security system;
   means for determining that the personal identification code is a duress code
   means for disarming the security system after the duress code has been entered, wherein the vehicle may be entered and driven away without any indication of an alarm; and
   means for disabling the vehicle after a period selected from a pre-determined amount of time or a pre-determined distance.

25. The system of claim 24, wherein the duress code has an identical number of alphanumeric characters as a normal personal identification number, wherein the normal personal identification number is the number entered to disarm the security system.

26. The system of claim 24, wherein the step of determining that the duress code has been entered further comprises:
   means for reading the entered code;
   means for retrieving the duress code from memory; and
   means for comparing the entered code with the duress code.

27. The system of claim 24, wherein a mobile telephone is installed in the vehicle, further comprising:
   means for retrieving a telephone number for authorities from a security system memory,
   means for calling authorities at the telephone number; and
   means for notifying the authorities of the car theft.

28. The system of claim 27, wherein the means for notifying provides silent notification to the authorities.

29. The system of claim 24, wherein a Global Positioning System is installed in the vehicle, further comprising:
   means for reading the vehicle's location from the global positioning system; and
   means for notifying the authorities of the vehicle's location.

30. The system of claim 24, further comprising:
   a mobile telephone installed in the vehicle,
   means for reading the location of the vehicle from a location system using the mobile telephone; and
   means for notifying the authorities of the vehicle's location.

* * * * *